United States Patent
Huang et al.

(10) Patent No.: US 9,389,301 B2
(45) Date of Patent: Jul. 12, 2016

(54) METHOD AND APPARATUS FOR DETERMINING TAG LOCATION

(71) Applicants: Alcatel-Lucent USA, Inc., Murray Hill, NJ (US); Alatel Lucent, Paris (FR)

(72) Inventors: Howard Huang, New York, NY (US); Dragan Samardzija, Highlands, NJ (US); Irwin Kennedy, Londonerry (IE); Stefan Valentin, Stuttgart (DE); Dmitry Chizhik, Highland Park, NJ (US); Gregory Wright, Fair Haven, NJ (US); Sarabjot Singh, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 36 days.

(21) Appl. No.: 14/193,867

(22) Filed: Feb. 28, 2014

(65) Prior Publication Data

US 2015/0247915 A1    Sep. 3, 2015

(51) Int. Cl.
*H04W 24/00* (2009.01)
*G01S 5/02* (2010.01)
*H04W 4/02* (2009.01)
*H04W 4/00* (2009.01)
*H04W 4/04* (2009.01)

(52) U.S. Cl.
CPC .............. *G01S 5/0205* (2013.01); *G01S 5/0252* (2013.01); *G01S 5/0273* (2013.01); *H04W 4/008* (2013.01); *H04W 4/028* (2013.01); *H04W 4/04* (2013.01)

(58) Field of Classification Search
CPC ..... H04W 4/028; H04W 4/008; H04W 4/025; H04W 4/04; H04W 36/32; H04W 64/006
USPC ......... 375/E1.002, 148, 150, E1.018, E1.032; 455/456.1, 456.2, 456.3, 456.5
See application file for complete search history.

(56) References Cited

U.S. PATENT DOCUMENTS

| | | | |
|---|---|---|---|
| 7,630,943 B2 | 12/2009 | Nerguizian et al. | |
| 2002/0089450 A1* | 7/2002 | Dowdle et al. | 342/453 |
| 2002/0131488 A1* | 9/2002 | Allpress | H04L 25/03057 375/233 |
| 2003/0099309 A1* | 5/2003 | Fimoff | H04L 25/0228 375/340 |
| 2004/0082356 A1* | 4/2004 | Walton | H04B 7/022 455/522 |
| 2006/0274849 A1* | 12/2006 | Ketchum | H04B 7/0413 375/267 |
| 2008/0197982 A1* | 8/2008 | Sadr | H03M 13/2957 340/10.4 |
| 2010/0311436 A1 | 12/2010 | Bevan et al. | |
| 2011/0171993 A1 | 7/2011 | Kim et al. | |
| 2011/0287778 A1* | 11/2011 | Levin et al. | 455/456.1 |

OTHER PUBLICATIONS

Indoor Localization with Channel Impulse Response Based Fingerprint and Nonparametric Regression Yunye Jin, Student Member, IEEE, Wee-Seng Soh, Member, IEEE, and Wai-Choong Wong, Senior Member, IEEE 1120 IEEE Transactions on Wireless Communications, vol. 9, No. 3, Mar. 2010.*
PCT International Search Report dated Jun. 1, 2015 (PCT/US/2015/015089) 4 pages.

* cited by examiner

*Primary Examiner* — Jean Gelin
(74) *Attorney, Agent, or Firm* — Carl Bilicska

(57) ABSTRACT

Various embodiments provide a method and apparatus for determining tag location by using one or more estimated channel responses (CR) that characterize the wireless channel between the tag and one or more respective anchors. In particular, a tracking server in communication with the anchor(s) determines the tag's location based on a comparison of the estimated CR(s) with a set of stored CRs associated with the anchor(s).

18 Claims, 6 Drawing Sheets

METHOD AND APPARATUS FOR DETERMINING TAG LOCATION

TECHNICAL FIELD

The invention relates generally to methods and apparatus for determining tag location.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known tag tracking schemes, determination of a tag's position is achieved using a combination of a GPS receiver attached to the tag and a cellular transceiver for communicating the tag's location back to the network.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for determining tag location by using one or more estimated channel responses (CR) that characterize the wireless channel between the tag and one or more respective anchors. In particular, a tracking server in communication with the anchor(s) determines the tag's location based on a comparison of the estimated CR(s) with a set of stored CRs associated with the anchor(s).

In a first embodiment, an apparatus is provided for determining a tags location. The apparatus includes an anchor configured to receive a wireless signal from the tag; a data storage configured to store a set of channel responses; and a processor communicatively connected to the data storage. The processor being programmed to: determine an estimated channel response based on the received wireless signal; and estimate the tag location based on the estimated channel response and the set of channel responses.

In a second embodiment, a method is provided for determining a tags location. The method includes: receiving a wireless signal from the tag; determining an estimated channel response based on the received wireless signal; and estimating the tag location based on the estimated channel response and the set of channel responses.

In a third embodiment, a non-transitory computer-readable storage medium is provided for storing instructions which, when executed by a computer, cause the computer to perform a method. The method includes: receiving a wireless signal from the tag; determining an estimated channel response based on the received wireless signal; and estimating the tag location based on the estimated channel characteristic and the set of channel impulse responses.

In some of the above embodiments, the channel responses are channel impulse responses.

In some of the above embodiments, determination of the estimated channel response includes programming the processor to perform a matched filtering operation.

In some of the above embodiments, the apparatus further includes a matched filter receiver communicatively connected to the processor. The matched filter receiver is configured to: correlate the received wireless signal; estimate a set of channel response characteristics associated with the received wireless signal; and provide the set of channel response characteristics to the processor. Where the matched filtering operation is based on the transmitted wireless signal.

In some of the above embodiments, a plurality of the set of channel responses include a representative channel response and an associated location.

In some of the above embodiments, the representative channel response includes a set of amplitudes and delays.

In some of the above embodiments, the apparatus further includes a second anchor configured to receive the wireless signal from the tag. Where the processor is further programmed to: determine a second estimated channel response based on the second received wireless signal; and further base the tag location on the second estimated channel response. Where the wireless interface and the second wireless interface are located at disparate locations.

In some of the above embodiments, the estimation of the tag location is based on a weighted sum of distance metrics associated with the estimated channel response and the second estimated channel response.

In some of the above embodiments, the estimated channel responses includes a set of amplitudes and associated delays.

In some of the above embodiments, the set of channel responses includes at least one non-line of sight bias parameter.

In some of the above embodiments, the method further includes: determining an anchor location; and generating at least a portion of the associated plurality of representative channel response and tag location pairs.

In some of the above embodiments, the estimated channel response includes the anchor location.

In some of the above embodiments, the method further includes: updating the anchor location; and updating at least a portion of the associated plurality of representative channel response and tag location pairs.

In some of the above embodiments, where updating the anchor location includes performing auto-localization to refine the location estimate of the anchor.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for determining tag location by using one or more estimated channel responses (CR) that characterize the wireless channel between the tag and one or more respective anchors. In particular, a tracking server in communication with the anchor(s) determines the tag's location based on a comparison of the estimated CR(s) with a set of stored CRs associated with the anchor(s).

Advantageously, the cost of tags may be reduced by eliminating the GPS and simplifying the wireless transmitter on the tag as compared to known tag tracking. Moreover, the elimination of the GPS from the tag may facilitate operation in more diverse environments such as within structures such as buildings and homes. As such, the class of articles that may be cost efficiently tracked may be expanded to include cars, bicycles, children, pets and any other article where location tracking is beneficial.

Figure 1:
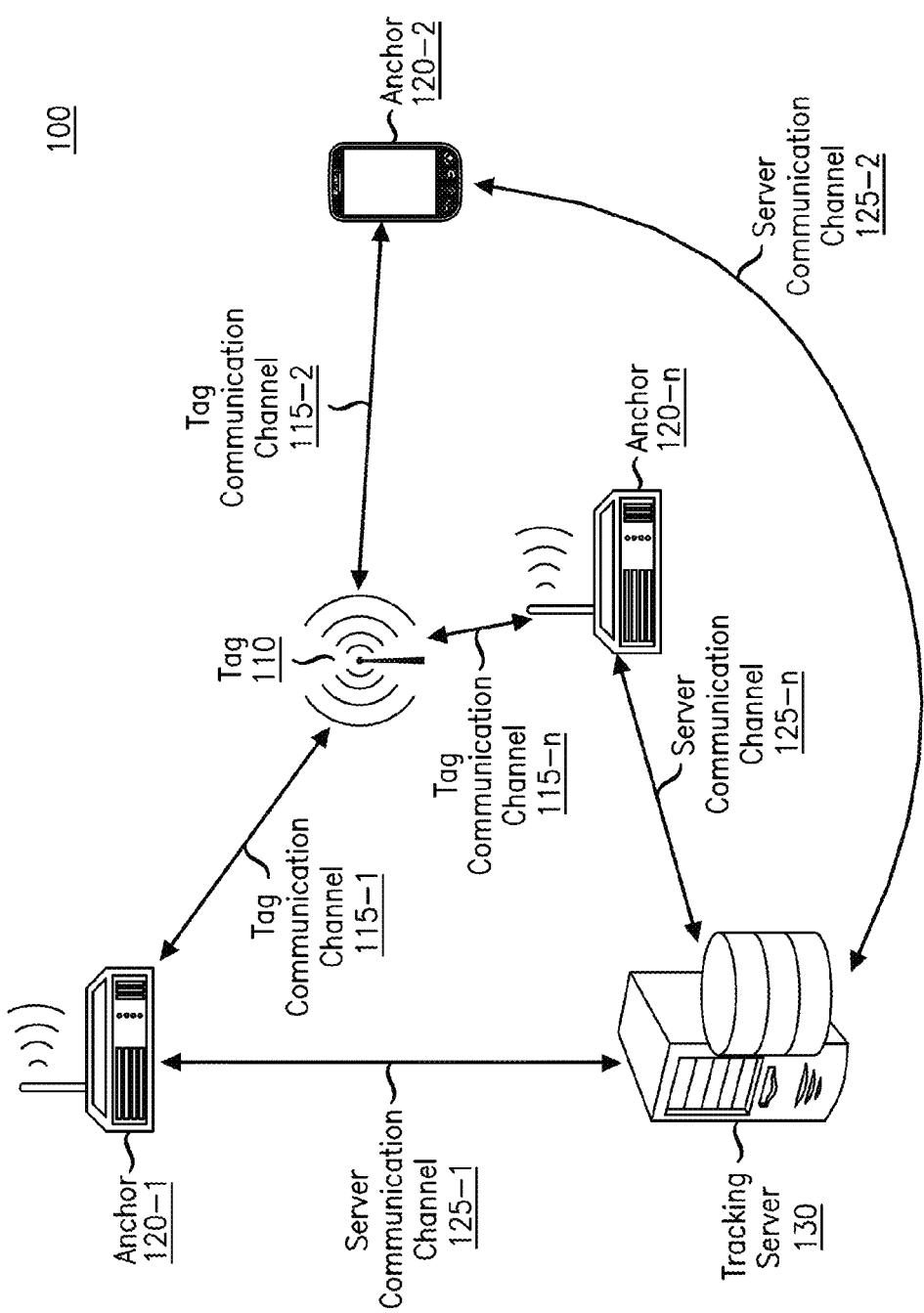
FIG. 1 illustrates a tag location network that includes an embodiment of a system 100 for providing tag location.

FIG. 1 illustrates a tag location network that includes an embodiment of a system 100 for providing tag location. The system 100 includes a tag 110 being tracked by tracking server 130 within the system. Tag 110 communicates with one or more anchors 120-1-120-*n* (collectively, anchors 120) over an appropriate one or more of tag communication channels 115-1-115-*n* (collectively, tag communication channels 115) and the one or more anchors 120 communicates with tracking server 130 over an appropriate one or more of server communication channels 125-1-125-*n* (collectively, server communication channels 125).

Tag 110 may include any type of communication device(s) capable of sending a wireless signal over one or more of tag communication channels 115. The wireless signal may be any arbitrary waveform. In some embodiments, the wireless signal has a bandwidth that is large compared to the inverse delay spread of the channel. As used herein, a bandwidth is large when compared to the inverse delay spread of the channel when the bandwidth is at least two (2) times larger than the inverse delay spread of the channel. Advantageously, a wireless signal that has a large bandwidth compared to the inverse delay spread of the channel will provide improved resolution of the multipath components of the channel when used to perform a matched filtering of the received wireless signal at the anchor. This yields a better estimated channel response which will result in a better location estimate. It should be appreciated that while one tag is illustrated here, system 100 may include more tags. Moreover, the number of tags at any one time may be dynamic as tags may be added or subtracted from the system at various times during operation.

Anchors 120 may include any type of communication device(s) capable of receiving the wireless signal sent from tag 110 over and an appropriate one of tag communication channels 115, determining an estimated channel response, and sending an anchor message(s) including the estimated channel response and information indicating the anchor location to server 130 via an appropriate one of server communication channels 125. In particular, the determination of the estimated channel response is based on the processing of the wireless signal propagated between the tag and anchor. It should be appreciated that the estimated CR is a characterization of the communication channel between a transmit (e.g., tag 110) and receive (e.g., anchor 220-1) antenna when a wireless signal is transmitted. Information indicating the anchor location may be any suitable information such as: (i) an identifier of the anchor such as an anchor id; (ii) actual location information (e.g., GPS coordinates); or (iii) the like.

In some embodiments, the anchor device is embedded in a communication device such as a thin client, a smart phone (e.g., anchor 120-2), a personal or laptop computer, server, network device, tablet, television set-top box, media player, automobile or the like. Communication devices may rely on other resources within exemplary system to perform a portion of tasks, such as processing or storage, or may be capable of independently performing tasks. It should be appreciated that while three anchors are illustrated here, system 100 may include fewer or more anchors. Moreover, the number of anchors at any one time may be dynamic as anchors may be added or subtracted from the system at various times during operation.

Tag communication channels 115 may be any suitable wireless connection capable of propagating the wireless signal generated by tag 110 to one or more of anchors 120 such as radio frequency, ultrasonic, or visible light signals. It should be appreciated that though depicted as a single connection, communication channels 115 may be any number or combinations of communication channels.

Server communication channels 125 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125 may be any number or combinations of communication channels.

Tracking server 130 may be any apparatus capable of communicating over one or more appropriate server communication channels 125 and determining the location of tag 110 based on the anchor message(s) received from one or more of anchors 120. In particular, tracking server 130 compares the received estimated channel response(s) with a set of stored CRs using a location estimation algorithm to determine the location of the tag. It should be appreciated that while only one tracking server is illustrated here, system 100 may include more tracking servers. It should be further appreciated though depicted as communicating with anchors 120 via server communication channels 125, tracking server 130 may communicate with anchors 120 through any suitable communication network or may reside in the same device as one or more of anchors 120.

In some embodiments, tag 110 is associated with an article such as a car, bicycle, child, or pet.

In some embodiments, the wireless signal transmitted by tag 110 includes information. Information may include any suitable data such as: type or name of the article associated with the tag, tag identifier or sensor data (e.g., heart rate, temperature or motion detection).

In some embodiments, the wireless signal is an RF signal.

In some embodiments, the wireless signal is an ultrasonic signal.

In some embodiments, the wireless signal is an infrared signal.

In some embodiments, the wireless signal is an RF WiFi signal. In some of these embodiments, the MAC address corresponding to the WiFi transceiver is used as the tag identifier.

In some embodiments, the wireless signal is an RF Bluetooth or IEEE 802.15.4 signal.

In some embodiments, the wireless signal is a wideband signal whose bandwidth exceeds the inverse delay spread of the channel. In some of these embodiments, the wireless signal is a wideband pseudo-random sequence. In some embodiments, the wireless signal is an ultrawideband pulse with very short time duration and bandwidth to carrier frequency ratio near unity.

In some embodiments, anchor 120 is configured to be connected to a network such as a wired local area network (LAN), wireless local area network (WLAN), a cellular network or a GPS network. In some of these embodiments, anchors are synchronized through the network.

In some embodiments of tag 110 and anchors 120, anchors could serve as transmitters and tags could serve as receivers. In these embodiments, the location of the anchor is transmitted and the tag determines its location autonomously.

Figure 2:
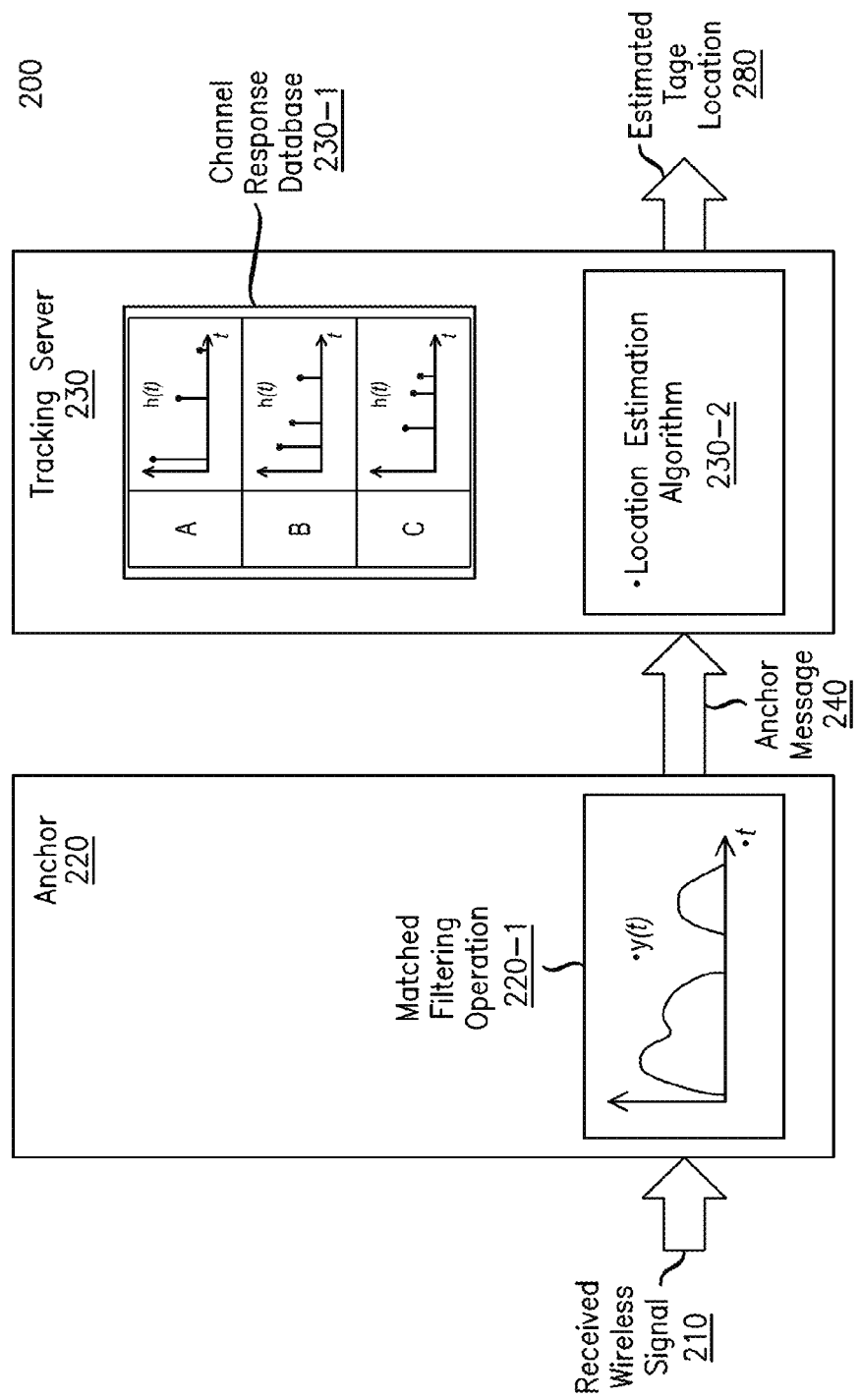
FIG. 2 schematically illustrates functional blocks of one of anchors 120 and tracking server 130 of FIG. 1.

FIG. 2 schematically illustrates functional blocks of one of anchors 120 and tracking server 130 of FIG. 1. Anchor 220 receives received wireless signal 210 and determines an estimated channel response by performing a matched filtering operation 220-1 on received wireless signal 210 and sends the estimated channel response to tracking server 230 in anchor message 240. Tracking server 230 receives anchor message 240 from anchor 220 and determines an estimated tag location 280 using a location estimation algorithm 230-2 which is based on the estimated channel response and a set of CRs in Channel response database 230-1.

Received wireless signal 210 is the received wireless signal (as defined herein) received from the transmitting tag (e.g., tag 110 of FIG. 1).

Matched filtering operation 220-1 receives received wireless signal 210 as an input and outputs an estimated channel response. In particular, matched filtering operation 220-1 transforms received wireless signal 210 using a matched filter receiver that is configured based on the wireless signal sent from the transmitting tag and then estimates the channel response of the wireless channel over which the received wireless signal travels. Channel response characteristics may be any suitable parameter such as phase, amplitude and time delay of the resolvable multipath components.

Figure 3:
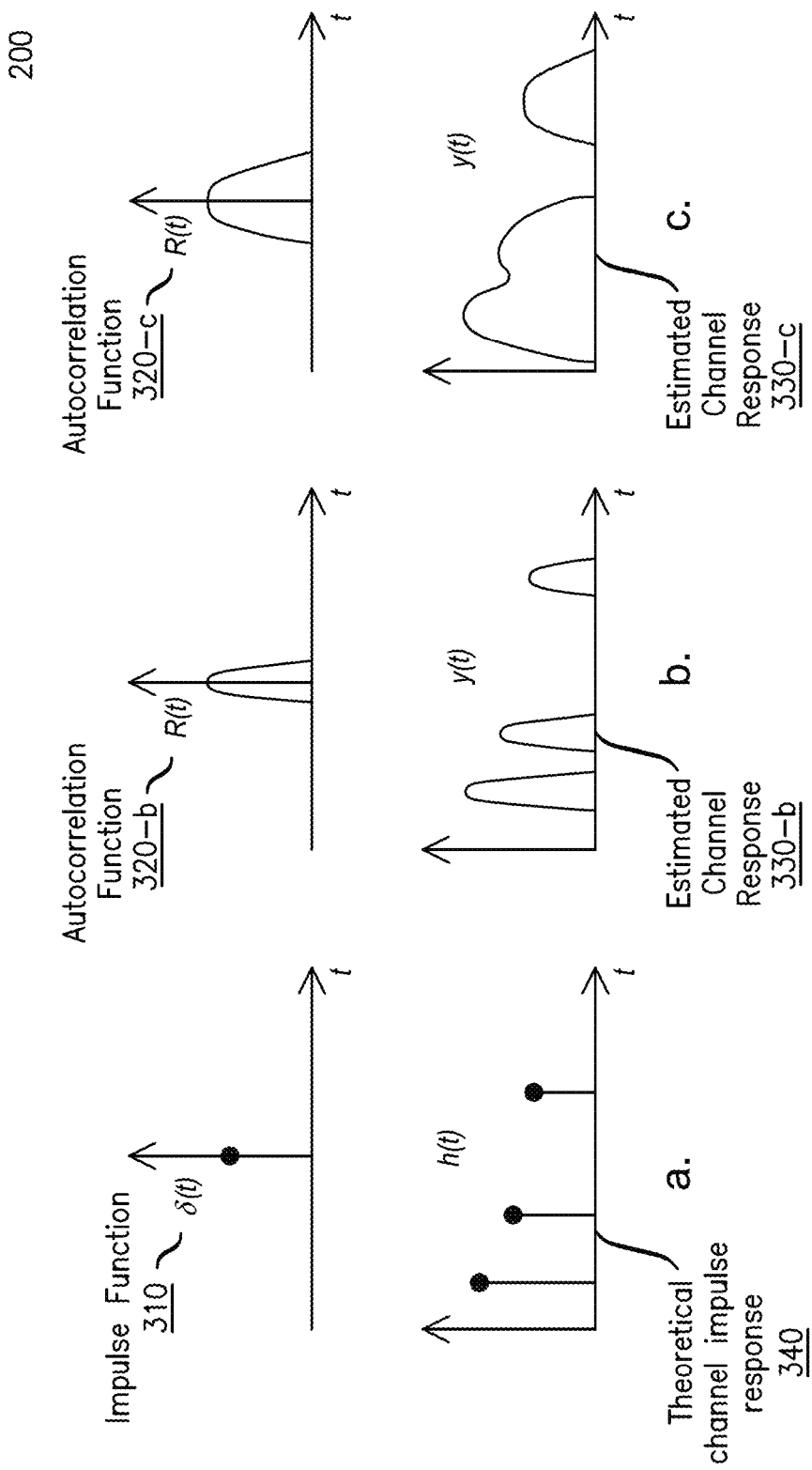
FIG. 3 depicts channel impulse response and estimated channel characteristics for a given channel realization.

For example, FIG. 3 depicts theoretical channel impulse response and estimated channel responses for a given channel realization. For a given channel defined by a set of N complex amplitudes and delays, FIG. 3a shows the theoretical channel impulse response 340 (e.g., h(t) of impulse function 310, and FIGS. 3b and 3c show the transformed wireless signals 330-b and 330-c at the output of a matched filter for wireless signals having two different autocorrelation functions 320-b and 320-c respectively. It should be appreciated that impulse function 310 is a mathematical construct representing a theoretical wireless signal having infinite bandwidth and zero duration.

In FIG. 3b, the received wireless signal s(t) has a higher bandwidth compared to FIG. 3c, so the autocorrelation function R(t) more closely matches the impulse function δ(t) in 310. It should be appreciated that even with the relatively low bandwidth received wireless signal s(t) used in FIG. 3c, the peaks and relative delays of the multipath components may be determined. Advantageously, the cost of a tag may be decreased by transmitting a lower bandwidth wireless signal.

Anchor message 240 is any number and type of suitable message(s) containing information based on the estimated channel response and information indicating the anchor location. The information based on the estimated channel response may be any suitable information associated with the channel response such as: (i) the channel response; (ii) a set of amplitudes and delays of the channel multipath components; (iii) the average received power; (iv) the time of arrival for the first multipath component; (v) or the like. It should be appreciated that in some embodiments the matched filter operation 220-1 may be performed by tracking serve 230.

Channel response database 230-1 may be any storage suitable of maintaining a set of channel response information. For example, as illustrated in Channel response database 230-1, the database may include a set of tag location-CR pairs (e.g., locations A, B, and C with their associated CRs) for a given anchor location/ID. It should be appreciated that though illustrated as signals, CRs may be stored in any suitable way such as a set of amplitudes and delays characterizing the channel response. It should also be appreciated that channel response database records may also include anchor identifiers or anchor locations.

Location estimate algorithm 230-2 may be any algorithm capable of determining the location of the tag that transmitted the wireless signal (e.g., tag 100 of FIG. 1) received by the anchor based on anchor message 240. In particular, location estimate algorithm 230-2 estimates the location of the tag, relative to the known location of the anchors, by comparing the information based on the estimated channel response with entries in the channel response database 230-1.

In some embodiments of matched filtering operation 220-1, the channel response parameters included in anchor message 240 are impulse response parameters that include the set of estimated amplitudes $\{a_n\}$ and delays $\{t_n\}$ based on the wireless signal transformed through matched filtering operation 220-1.

In some embodiments of the channel response database 230-1, the channel response parameters include time of arrival for the first multipath. In these embodiments, non-line of sight (NLOS) channel environments result in a positive timing bias offset as a result of the reflected signal taking a longer time to reach the anchor and the distance between the transmitter and receiver is based on NLOS bias. In some of these embodiments, the NLOS bias is a parameter characterized individually for buildings using propagation models as described herein, and a NLOS bias parameter may be associated with the channel response. Advantageously, the NLOS bias parameters may be used by location estimation algorithm 230-2 to improve the accuracy.

In some embodiments of matched filtering operation 220-1, the wireless signal transmitted by the tag (e.g., tag 110 of FIG. 10) to the anchor (e.g., one of anchors 120 of FIG. 1) is assumed to be over a wireless RF communication link (e.g., an appropriate one of tag communications channels 115 of FIG. 1) with multipath fading, and the channel impulse response as a function of time t, for an environment where the transmitter (e.g., tag), receiver (e.g., anchor), and environment (e.g., building environment) are all stationary, is characterized as:

$$h(t) = \sum_{n=1}^{N} a_n \delta(t - t_n)$$

where N is the number of multipath components, $a_n$ is a complex scalar denoting the complex amplitude of the nth multipath component, $\delta(t)$ is the dirac-delta (impulse) function, and $t_n$ is its time delay.

In some embodiments, the autocorrelation function is based on correlative sounding. For example, by letting s(t) be the wideband signal with autocorrelation given by $$R(t) = \int_{-\infty}^{\infty} s(\tau - t) s(\tau) d\tau$$

where for simplicity, we assume that s(t) is a real-valued function. If this signal is transmitted over the channel with impulse response h(t) above, the received signal (assuming negligible additive noise) is $$r(t) = \sum_{n=1}^{N} a_n s(t - t_n).$$

By correlating the received signal with a signal matched to the transmitted signal s(t), the matched filter output is:

$$y(t) = \int_{-\infty}^{\infty} s(\tau - t) r(\tau) d\tau$$
$$= \int_{-\infty}^{\infty} s(\tau - t) \sum_{n=1}^{N} a_n s(\tau - t_n) d\tau$$
$$= \sum_{n=1}^{N} a_n \int_{-\infty}^{\infty} s(\tau - t) s(\tau - t_n) d\tau$$
$$= \sum_{n=1}^{N} a_n R(t - t_n)$$

Advantageously, if the autocorrelation function is similar to the impulse function, then the matched filter output y(t) is a good approximation of the channel impulse response.

In some embodiments, location estimate algorithm 230-2 is based on a "nearest neighbor" algorithm which determines the channel response in the database which most closely matches estimated channel response in anchor message 240. For example, referring to FIGS. 2 and 3, the estimated channel response 330-b is closest to the channel impulse response for location "B" in Channel response database 230-1, so estimated tag location 280 may indicate that the tag is at or near location "B". In some of these embodiments, a distance metric can be computed between the estimated channel response and each database channel response, and the algorithm chooses the location corresponding to the database channel response with the lowest distance metric.

In some embodiments, location estimate algorithm 230-2 accounts for simultaneous estimated channel responses received from multiple anchors. In particular, the algorithm chooses the location corresponding to the lowest weighted sum of distance metrics, where the weights are selected based on the estimated physical distance between the tag and the anchors.

In some embodiments, location estimate algorithm 230-2 is based on the absolute set of amplitudes and delays from the estimated channel response.

In some embodiments, location estimate algorithm 230-2 is based on the relative amplitudes and delays in the set of amplitude and delays. Advantageously, if the tag's power amplifier or timing is not properly calibrated so that the absolute amplitudes or delays do not match with any in Channel response database 230-1, the tag's location may still be determined based on the relative amplitudes and delays. Moreover, by considering multiple parameters, location determination may be more robust and reduce calibration or measurement error.

In some embodiments, anchor message 240 is an analog signal.

In some embodiments, anchor message 240 is a packet based message. In some of these embodiments, anchor message 240 is sent over a packet-based network.

In some embodiments, anchor message 240 is more than one message. In some of these embodiments, anchor message 240 includes a first message comprising the information based on the estimated channel response and a second message comprising the information indicating the anchor location.

In some embodiments, all or a portion of the functions of anchor 220 or tracking server 230 may be co-located or reside in the same device of tracking server 230 or anchor 220 respectively. In some embodiments, anchor 220 and tracking server 230 may be co-located or reside in the same device. In some embodiments, a tag can be co-located with the anchor, so that this anchor could receive the signals of other tags.

In some embodiments, anchor 220 and tracking server 230 may share resources such as processors, storage or network interfaces.

Figure 4:
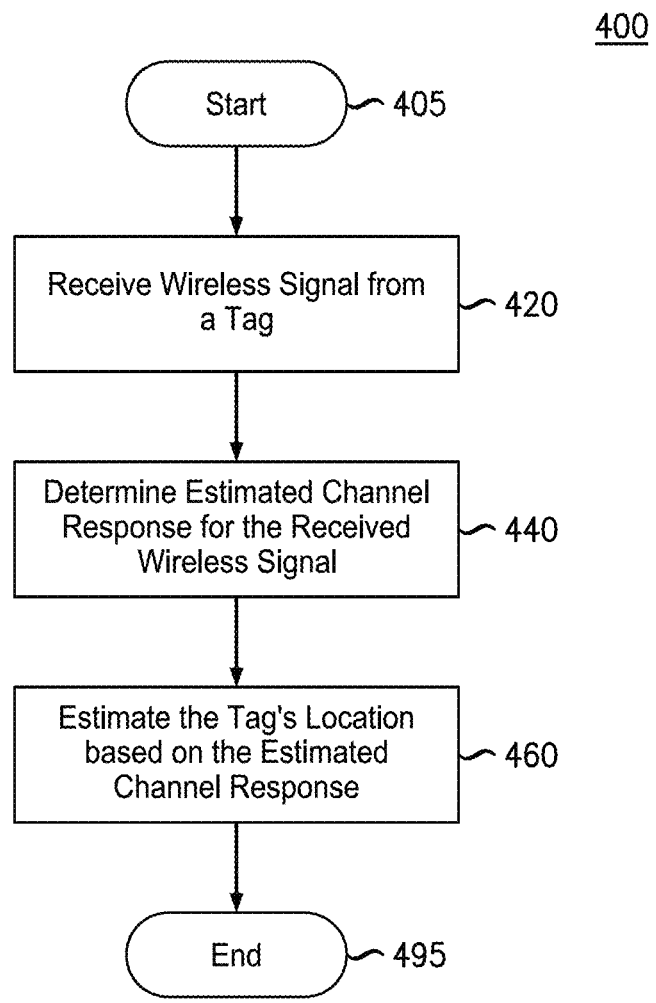
FIG. 4 depicts a flow chart illustrating an embodiment of a method 400 for an apparatus (e.g., one or more of anchors 120 and tracking server 130 of FIG. 1) to determine a tag's (e.g., tag 110 of FIG. 1) location.

FIG. 4 depicts a flow chart illustrating an embodiment of a method 400 for an apparatus (e.g., one or more of anchors 120 and tracking server 130 of FIG. 1) to determine a tag's (e.g., tag 110 of FIG. 1) location. The method starts at step 405 and includes: receiving a wireless signal from a tag (step 420); determining an estimated channel response for the received wireless signal (step 440); estimating the tag's location based on the estimated channel response (step 460); and ending at step 495.

In the method 400, the step 420 includes receiving a wireless signal from a tag as described herein.

In the method 400, the step 440 includes determining an estimated channel response for the received wireless signal as described herein.

In the method 400, the step 460 includes estimating the tag's location based on the estimated channel response as described herein.

Figure 5:
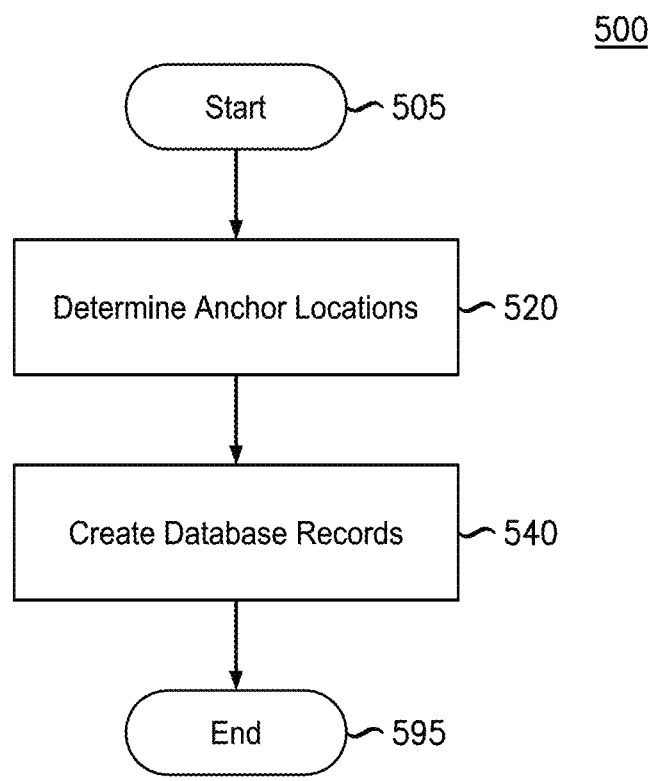
FIG. 5 depicts a flow chart illustrating an embodiment of a method 500 for an apparatus (e.g., one or more of anchors 120 and tracking server 130 of FIG. 1) to initialize a tag tracking system (e.g., system 100 of FIG. 1)

FIG. 5 depicts a flow chart illustrating an embodiment of a method 500 for an apparatus (e.g., one or more of anchors 120 and tracking server 130 of FIG. 1) to initialize a tag tracking system (e.g., system 100 of FIG. 1). The method starts at step 505 and includes: determining anchor locations (step 520); creating database records (step 540); and ending at step 595.

In the method 500, the step 520 includes determining anchor locations within.

In the method 500, the step 540 includes creating database records. In particular, records of channel responses associated with locations and optionally associated with one or more anchor locations are created or populated in a database (e.g., in Channel characteristic database 230-1 of FIG. 2).

In some embodiments of the step 520, one or more anchor locations are entered into the channel response database via user input.

In some embodiments of the step 520, one or more anchor locations are entered into the system via user input.

In some embodiments of the step 520, one or more anchor locations are entered into the channel response database via an anchor message sent from the anchor (e.g., anchor 220 of FIG. 2) to the tracking server (e.g., tracking server 230 of FIG. 2). In some of these embodiments, the anchor message is the estimated channel response.

In some embodiments of the step 520, one or more anchors (e.g., anchor 220 of FIG. 2) includes a GPS or other location enabling device and anchor locations are determined by the location enabling device.

In some embodiments of the step 520, one or more anchor locations are determined by cooperation between a number of the anchors (e.g. anchors 120 of FIG. 1) using auto-localization. In some of these embodiments, an anchor's location is determined by allowing an anchor (e.g., anchor 120-1 in FIG. 1) to act as a tag transmitting a wireless signal. One or more of the other anchors (e.g., one or more of anchors 120-2-**120-*n*) process the wireless signal(s) transmitted by the anchor acting as a tag, and the tracking server (e.g., tracking server 130 in FIG. 1**) then may estimate the location of the anchor acting as a tag in a similar fashion to determining the location of a tag as described herein. In some of these embodiments, anchors are assigned to non-overlapping sets consisting of nearby anchors, and the anchors within a given set transmit beacon signals one at a time in a predetermined (e.g., round-robin) sequence.

In some embodiments, auto-localization is used in the background to continually refine the location estimates of the anchors.

In some embodiments of the step 520, one or more anchor locations are determined through the use of an agent. In particular, an agent with known location travels around the environment of interest. In some embodiments, the agent could acquire its location via a location enabling device such as GPS. The agent acts as a tag as it moves; transmitting a wireless signal that is detected by nearby anchors. During transmission of the wireless signal, the agent also communicates its location to the anchors. The agent position is transmitted in anchor message and the tracking server estimates the anchor position based on the estimated channel response and agent position included in the anchor message.

In some embodiments of step 540, the channel responses are channel impulse responses, corresponding to the transmission of a signal whose autocorrelation function are the impulse function. In some embodiments of step 540, the channel responses correspond to a band-limited transmitted waveform.

In some embodiments of step 540, channel responses are generated using a propagation tool and optionally a building floor plan for inside of a building or a map including footprints and exterior envelops of buildings and other obstructions for outdoors. In some of these embodiments, the propagation tool is based on ray-tracing techniques. In some of these embodiments, the propagation tool is based on waveguide-diffusion channel models.

In some embodiments of step 540, channel responses are generated using stochastic propagation models (e.g., based on diffusion theory). In particular, the models are used to predict path loss as a function of location for indoor enterprise environments with hallways and for outdoor urban environments with dense street grids. Advantageously, these models require only a coarse characterization of the environment.

In some embodiments of step 540, database records are populated after receipt of an anchor message (e.g., anchor message 240 of FIG. 2). In some of these embodiments, the location of the anchor is included in the anchor message and one or more database records are created based on the received anchor location. For example, for a mobile anchor (e.g., mobile phone anchor 120-2 of FIG. 1) the anchor message may include a location of the mobile anchor such as generated by the GPS of the mobile anchor and database records may be dynamically generated based on a blueprint of the building in which the mobile anchor is located. It should be appreciated that if the anchor is mobile, the channel response between any location and the anchor may be generated dynamically based on the anchor location and the building blueprint, for example, via ray tracing.

In some embodiments of step 540, channel responses are generated for points in a two-dimensional grid with a distance space of d. Advantageously, by generating channel responses for each of the points within the two-dimensional grid, the location of the tag may be determined with an accuracy of (d/2). In some of these embodiments, the two-dimensional grid is centered based on a received anchor location and the channel responses are generated after receipt of the estimated channel response.

In some embodiments of step 540, one or more channel responses are updated at a suitable time such as based on a periodic update or based on a determination that the channel responses have changed. For example, channel responses may change over time due to the movement of people, door position, furniture position, structural changes to the building, new construction or the like. Advantageously, since these changes may only partially modify the channel response, rays unaffected by the environmental change will have the same delay, amplitude and phase. In some embodiments, unaffected parameters are used to determine the likely position of a tag or determine the likelihood that a tag has moved since the last location estimation. In some embodiments, the periodic capture of the tag's channel response enables analysis of the changes to channel response over time and triggers a database channel response update when changes greater than a threshold amount are detected.

Although primarily depicted and described in a particular sequence, it should be appreciated that the steps shown in methods 400 and 500 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 6:
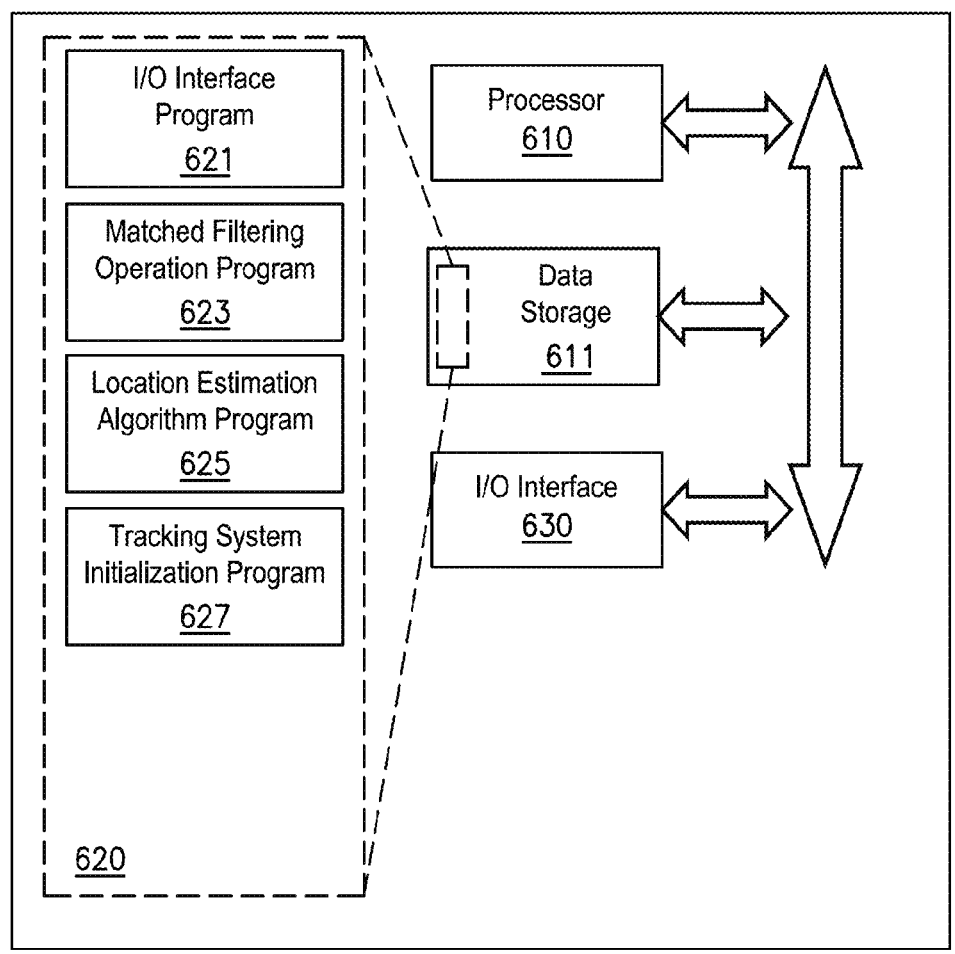
FIG. 6 schematically illustrates an embodiment of an apparatus 600 such as one of anchors 120 or tracking server 130 of FIG. 1.

FIG. 6 schematically illustrates an embodiment of an apparatus 600 such as one of anchors 120 or tracking server 130 of FIG. 1. The apparatus 600 includes processor 610, data storage 611, and I/O interface 630.

The processor 610 controls the operation of the apparatus 600. The processor 610 cooperates with the data storage 611.

The data storage 611 stores appropriate ones of programs 620 executable by the processor 610. Data storage 411 may also optionally store program data such as Channel response database (e.g., Channel response database 230-1 of FIG. 2) or the like as appropriate.

The processor-executable programs 620 may include an I/O interface program 621, a matched filtering operation program 623, a location estimation algorithm program 625 or a tracking system initialization program 627. Processor 610 cooperates with processor-executable programs 620.

The I/O interface 630 cooperates with processor 610 and I/O interface program 621 to support communications over communication channels 115 or 125 of FIG. 1 as appropriate and as described above.

The matched filtering operation program 623 performs steps 420 and 440 of FIG. 4 as described above.

The location estimation algorithm program 625 performs step 460 of FIG. 5 as described above.

The tracking system initialization program 627 performs one or more of the steps of method(s) 500 of FIG. 5 as described above.

In some embodiments, the processor 610 may include resources such as processors/CPU cores, the I/O interface 630 may include any suitable network interfaces, or the data storage 611 may include memory or storage devices. Moreover the apparatus 600 may be any suitable physical hardware configuration such as: one or more server(s), blades consisting of components such as processor, memory, network interfaces or storage devices. In some of these embodiments, the apparatus 600 may include cloud network resources that are remote from each other.

In some embodiments, the apparatus 600 may be virtual machine. In some of these embodiments, the virtual machine may include components from different machines or be geographically dispersed. For example, the data storage 611 and the processor 610 may be in two different physical machines.

When processor-executable programs 620 are implemented on a processor 610, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing a tag location of a tag, the apparatus comprising:
    an anchor configured to receive a wireless signal from the tag;
    a data storage configured to store a set of channel responses; and
    a processor communicatively connected to the data storage, the processor being configured to:
    determine an estimated channel response based on the received wireless signal; and
    estimate the tag location based on the estimated channel response and the set of channel responses;
    wherein determination of the estimated channel response includes configuring the processor to perform a matched filtering operation; and
    a matched filter receiver communicatively connected to the processor, the matched filter receiver being configured to:
    correlate the received wireless signal;
    estimate a set of channel response characteristics associated with the received wireless signal; and
    provide the set of channel response characteristics to the processor;
    wherein the matched filtering operation is based on the transmitted wireless signal.

2. The apparatus of claim 1, wherein the channel responses are channel impulse responses.

3. The apparatus of claim 1, wherein a plurality of the set of channel responses include a representative channel response and an associated location.

4. The apparatus of claim 3, wherein the representative channel response includes a set of amplitudes and delays.

5. The apparatus of claim 1, wherein the apparatus further includes:
- a second anchor configured to receive the wireless signal from the tag;
- wherein the processor is further configured to:
- determine a second estimated channel response based on the reception of the wireless signal at the second anchor; and
- further base the estimate of the tag location on the second estimated channel response;
- wherein the anchor and the second anchor are located at disparate locations.

6. The apparatus of claim 5, wherein the estimation of the tag location is based on a weighted sum of distance metrics associated with the estimated channel response and the second estimated channel response.

7. The apparatus of claim 1, wherein the estimated channel responses includes a set of amplitudes and associated delays.

8. The apparatus of claim 1, wherein the set of channel responses includes at least one non-line of sight bias parameter.

9. The apparatus of claim 1, wherein the received wireless signal does not contain location information.

10. The apparatus of claim 1, wherein the apparatus does not comprise a GPS.

11. The apparatus of claim 1, wherein the received wireless signal comprises first information, the first information identifying a physical article associated with the tag.

12. A method for providing a tag location of a tag, the method comprising:
- at an anchor configured to receive a wireless signal, receiving a wireless signal from the tag;
- at a processor communicatively connected to a data storage comprising a set of channel responses, determining an estimated channel response based on the received wireless signal; and
- estimating, by the processor in cooperation with the data storage, the tag location based on the estimated channel response and the set of channel responses;
- wherein determining the estimated channel response includes performing a matched filtering operation; and
- at a matched filter receiver, correlating the received wireless signal;
- at the matched filter receiver, estimating a set of impulse response characteristics associated with the received wireless signal; and
- at the matched filter receiver, providing the set of impulse response characteristics to the processor;
- wherein the matched filtering operation is based on the transmitted wireless signal.

13. The method of claim 12, wherein a plurality of the set of channel responses include an anchor location and an associated plurality of representative channel response and tag location pairs.

14. The method of claim 13, wherein the method further comprises:
- determining, by the processor in cooperation with the data storage, an anchor location; and
- generating, by the processor in cooperation with the data storage, at least a portion of the associated plurality of representative channel response and tag location pairs.

15. The method of claim 14, wherein the estimated channel response includes the anchor location.

16. The method of claim 13, wherein the method further comprises:
- updating, by the processor in cooperation with the data storage, the anchor location; and
- updating, by the processor in cooperation with the data storage, at least a portion of the associated plurality of representative channel response and tag location pairs.

17. The method of claim 16, wherein updating the anchor location includes performing auto-localization to refine the location estimate of the anchor.

18. A non-transitory computer-readable storage medium storing instructions which, when executed by a computer, cause the computer to perform a method, the method comprising:
- receiving a wireless signal from the tag;
- determining an estimated channel response based on the received wireless signal; and
- estimating the tag location based on the estimated channel characteristic and the set of channel impulse responses;
- wherein determining the estimated channel response includes performing a matched filtering operation; and
- correlating the received wireless signal;
- estimating a set of impulse response characteristics associated with the received wireless signal; and
- providing the set of impulse response characteristics to the processor;
- wherein the matched filtering operation is based on the transmitted wireless signal.

* * * * *